Figure 1:
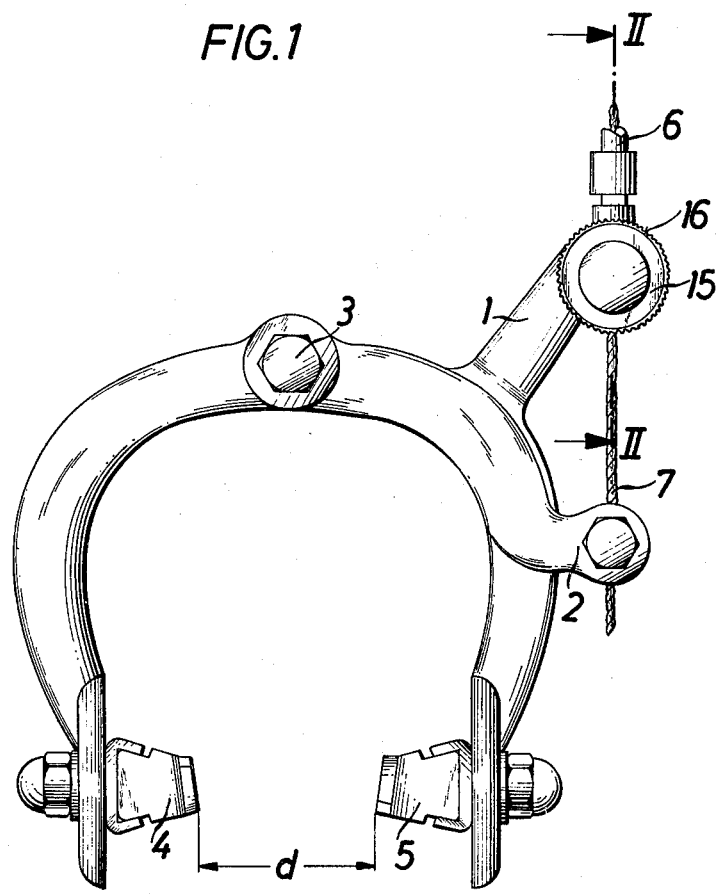

United States Patent

Schoch

[11] 3,941,215
[45] Mar. 2, 1976

[54] BICYCLE BRAKE ADJUSTING APPARATUS

[75] Inventor: Robert Schoch, Singen, Hohentwiel, Germany

[73] Assignee: Weinmann Aktiengesellschaft, Schaffhausen, Switzerland

[22] Filed: June 23, 1975

[21] Appl. No.: 589,254

[30] Foreign Application Priority Data
June 27, 1974  Germany............................ 2430871
May 22, 1975  Germany...................... 7516284[U]

[52] U.S. Cl............. 188/24; 188/2 D; 188/196 BA
[51] Int. Cl.² ................... F16D 65/46; F16D 65/56
[58] Field of Search............ 188/2 D, 24, 71.7–71.9, 188/196 M, 196 BA

[56] References Cited
UNITED STATES PATENTS
711,443 10/1902 Sharp............................. 188/2 D X
3,870,127 3/1975 Wilson et al........................... 188/24

FOREIGN PATENTS OR APPLICATIONS
835,797 10/1938 France................................. 188/24
1,053,160 9/1953 France............................... 188/2 D Primary Examiner—Duane A. Reger
Attorney, Agent, or Firm—Learman & McCulloch

[57] ABSTRACT

Apparatus for adjusting the distance between brake blocks carried at the free ends of relatively pivotal stirrups of a rim brake mechanism and pivotal by means of a bowden cable, the apparatus comprising an axially movable adjusting screw in threaded engagement with a freely rotatable sleeve having gear teeth in mesh with the teeth of a rotatable driver. The core of the cable passes through the screw and the latter is fixed to the core cover.

10 Claims, 7 Drawing Figures

U.S. Patent   March 2, 1976   Sheet 1 of 2   3,941,215

BICYCLE BRAKE ADJUSTING APPARATUS

The invention relates to a device for adjusting the distance between the two brake blocks of a bicycle rim brake whose bowden cable core is connected to the tension stirrup of the rim brake and whose bowden cable cover is adjustably connected via an externally threaded adjusting screw to a lug of the pressure stirrup of the rim brake.

In conventional devices of this type the externally threaded adjusting screw connected to the bowden cable cover is screwed into a threaded bore of the lug of the pressure stirrup or yoke member. Thus, by turning this adjusting screw the distance may be varied between the ends of the bowden cable cover and the bowden cable core connected respectively to the pressure stirrup and the tension stirrup. In this manner, with increasing wear of the brake blocks the distance between the latter can be returned to the original value.

Since the bowden cable is subjected to the tension of the spring acting on the two brake stirrups or yokes and for this reason the friction of the adjusting screw in the threaded bore of the lug of the pressure stirrup is relatively high, the turning of the adjusting screw requires a considerable expenditure of force, particularly since the grip surface available to the user on the adjusting screw provided with a knurled flange is fairly small. Generally the user will not think of making this adjustment of the adjusting screw easier by pressing the two brake stirrups together (cancelling the spring force).

The invention has for its objective avoiding these disadvantages of the known constructions and developing a device which permits the user to adjust the distance between the two brake blocks of a bicycle rim brake in a particularly simple and energy-saving manner.

According to the invention, this objective is achieved in that the adjusting screw is arranged in a sleeve which is provided with an internal thread and a gear flange and is rotatably mounted in the lug of the pressure stirrup for rotation by a drive disc which is also mounted on the lug of the pressure stirrup for rotation about an axis that extends perpendicularly to that of the sleeve. The drive disc is provided at that side facing the sleeve with teeth in mesh with the gear flange of the sleeve in the manner of an angle drive.

In this manner a reduction is obtained which permits the user to turn the sleeve by means of the drive disc with very little effort and thus to move the adjusting screw within the sleeve in the longitudinal direction. Apart from the reduction present between the drive disc and the sleeve, another advantage is the good accessibility of the drive disc for the user. Finally, the total force required is further reduced by the fact that the adjusting screw, in contrast to hitherto known constructions, need not be turned but merely moved in the longitudinal direction through the sleeve so that the bowden cable cover remains free of any rotational stresses.

In the simplest form the drive disc is constructed according to the invention as an adjusting member actuable by hand. For this purpose it may for example be provided with a knurling at its periphery.

If however automatic adjustment of the distance between the two brake blocks is desired, according to an expedient further development of the invention the drive disc may be actuable by a control lever arranged at the free end of the tension stirrup. For this purpose, the drive disc may carry at its outer periphery a plurality of uniformly distributed projections with which the pivotal control lever subjected to spring pressure cooperates in the manner of a ratchet mechanism.

Figure 3:
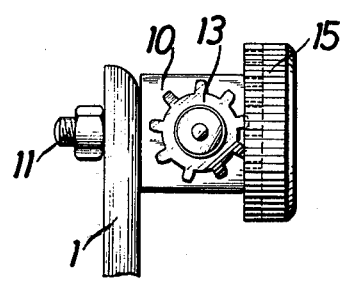
Figure 2:
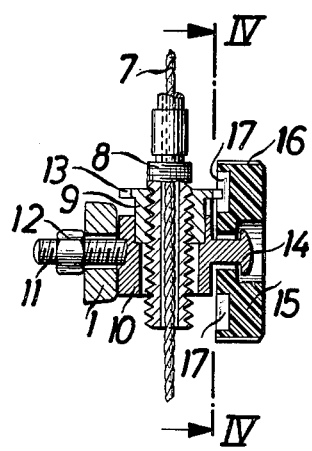
Figure 4:
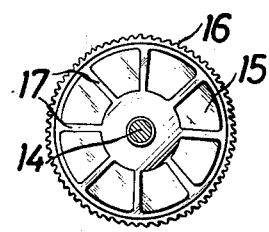
Figure 5:
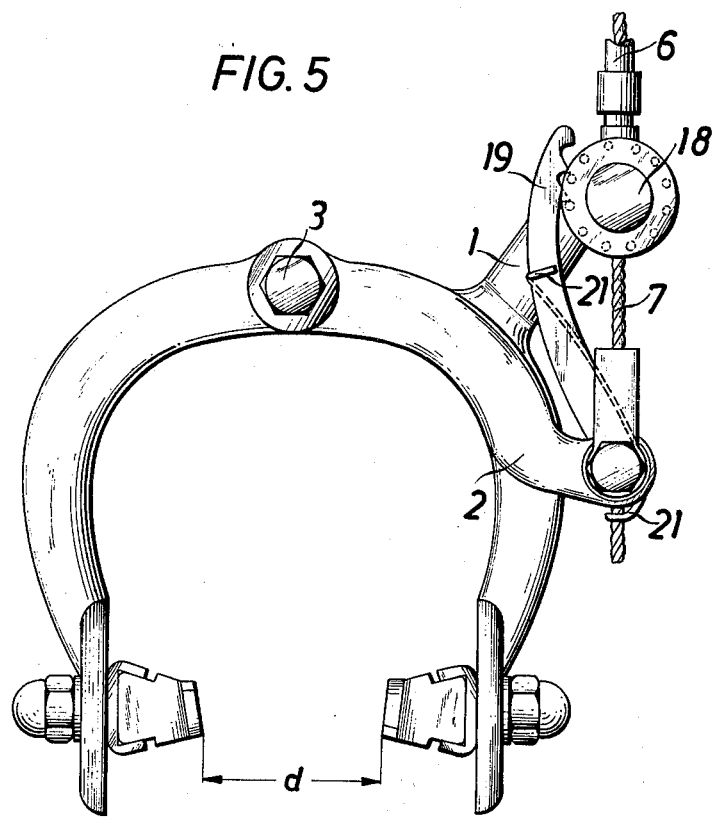
Figure 7:
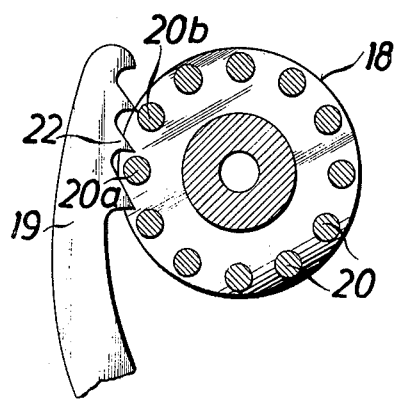
Figure 6:
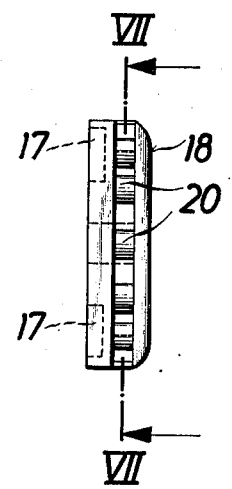

These and further details of the invention will be apparent from the appended subsidiary claims and from the following description of two embodiments, wherein:

FIG. 1 shows a front view of a bicycle rim brake equipped with the device according to the invention;
FIG. 2 shows a section along the line II—II of FIG. 1;
FIG. 3 is a view of the adjusting device from above;
FIG. 4 is a section along the line IV—IV of FIG. 2;
FIG. 5 is a front view of a vehicle rim brake which is equipped with an automatic adjusting device;
FIG. 6 is a side view of the drive disc of the embodiment of FIG. 5; and
FIG. 7 is a section through the drive disc along the line VII—VII of FIG. 6.

The bicycle rim brake illustrated in FIGS. 1 to 4 comprises in usual manner two brake stirrups or yokes 1 and 2 which are pivotal with respect to each other about the axis 3 and are subjected to the action of a spring which is not shown and which urges the brake stirrups apart. The two stirrups carry brake blocks 4 and 5 whose spacing $d$ increases with increasing wear, making adjustments necessary.

The stirrup 1, which acts as the pressure stirrup, is connected to the cover 6 of a bowden cable and the stirrup 2, which acts as the tension stirrup, is connected to the core 7 of the cable which extends axially through the cover.

To enable the distance $d$ between the brake blocks 4 and 5 to be adjusted to the desired value an adjusting device is provided between the bowden cable cover 6 and the stirrup 1. It comprises an externally threaded, axially bored adjusting screw 8 which is connected to the bowden cable cover 6 and through which the core 7 passes. The adjusting screw 8 is mounted in a sleeve 9 which has an internal thread and is mounted for free rotation in a lug 10 of the stirrup 1. The lug 10 is fixedly connected to the stirrup 1 by a bolt 11 and a nut 12.

The sleeve 9, which bears on the upper side of the lug 10 of the stirrup 1, carries in its portion lying above the lug 10 a toothed gear flange 13.

A drive disc 15 is freely, rotatably mounted on a bearing pin 14 projecting from the lug 10. The axis of rotation of the disc extends perpendicularly to that of the sleeve 9 and substantially parallel to the pivot axis 3 of the stirrups 1, 2.

The drive disc 15, which is preferably made from a suitable plastic material, is provided at its periphery with a knurling 16 and comprises at that side facing the sleeve 9 a plurality of teeth 17 which mesh with the teeth of the gear flange 13 of the sleeve 9 in the manner of an angle drive.

The diameter of the drive disc 15 is a multiple (2 to 4 times, preferably about 2.5 to 3.5 times) of the external diameter of the thread of the adjusting screw 8. This gives between the drive disc 15 and the sleeve 9 a reduction which permits easy actuation.

To reduce the distance d between the brake blocks 4 and 5 the drive disc 15 is turned so that the adjusting screw 8 is moved axially upwardly relative to the sleeve 9.

In the second embodiment of the invention illustrated in FIGS. 5 to 7 an automatic adjustment independent of the user is effected of the distance between the two brake blocks. Insofar as this embodiment contains identical components to the embodiment according to FIGS. 1 to 4 the same reference numerals are used. It would also be superfluous to explain these identical components again. This applies in particular to the bowden cable, the adjusting screw 8, the sleeve 9 with the gear flange 13, and the lug 10 of the stirrup 1 serving for the mounting.

The difference between the embodiment explained above resides more particularly in the drive disc 18 and an operating arm or lever 19 serving for the actuation thereof.

The drive disc 18 is also provided at that side facing the sleeve 9 with teeth 17 which mesh with the teeth of the gear flange 13 of the sleeve 9. In addition, the drive disc 18 carries at its outer periphery a plurality of uniformly distributed projections with which the operating lever 19 cooperates in the manner of a ratchet mechanism.

The lever 19 is rotatably mounted at the free end of the stirrup 2 and is held by a spring 21 in engagement on the periphery of the drive disc 18.

Assume that when the brake is not actuated the tooth or pawl 22 of the lever 19 engages the projection 20a of the drive disc 18. If the brake is now applied the lever 19 moves upwardly so that the pawl 22 approaches the projection 20b (following the projection 20a in the clockwise direction). For as long as the distance d between the brake blocks does not drop below a predetermined value on application of the brake, the pawl 22 of the lever 19 will not reach the projection 20b. When the brake is released the lever 19 then returns to its original position at the projection 20a, and the drive disc 18 thus does not change its position. Consequently, the position of the adjusting screw 8 also remains unchanged.

If however when the brake is applied the distance d between the brake blocks 4 and 5 goes below the predetermined value, then with the brake applied the pawl 22 of the lever 19 is urged by the spring into engagement with the projection 20b of the drive disc 18.

When the lever 19 moves downwardly on release of the brake it then entrains the drive disc 18 via the engaged projection 20b through a predetermined angular amount (i.e. the division between successive projections 20). Via the sleeve 9 this rotation of the drive disc 18 adjusts the adjusting screw 8 with respect to the lug 10 in the axial direction and thus reestablishes the desired distance between the brake blocks.

Finally, it is emphasized that the adjusting device according to the invention can be fitted without difficulty subsequently to already existing rim brakes, both in the simple form of manual adjustment and in the automatically operating embodiment.

What is claimed is:

1. Apparatus for adjusting the distance between brake blocks of a bicycle rim brake having stirrups pivotal relative to one another in response to axial movement of a bowden cable core passing through a cover and fixed to one of said stirrups, said apparatus comprising a lug fixed to the other of said stirrups; an internally threaded sleeve rotatably carried by said lug; an axially bored, externally threaded screw fixed to the cover of said bowden cable and in threaded engagement with said sleeve, said core passing through said screw; a toothed flange fixed to said sleeve; a driver having teeth in mesh with the teeth of said flange; and means mounting said driver on said lug for rotation whereby the teeth on said driver and said flange effect rotation of the latter and axial adjustment of said screw with consequent axial adjustment of said core and cover and relative pivotal movement of said stirrups.

2. Apparatus according to claim 1 wherein the axis of rotation of said driver is substantially parallel to the pivotal axis of said stirrups.

3. Apparatus according to claim 1 wherein said sleeve bears rotatably on said lug and has its toothed flange located at a level spaced from said lug.

4. Apparatus according to claim 1 wherein said driver is manually rotatable.

5. Apparatus according to claim 4 wherein said driver comprises a disc.

6. Apparatus according to claim 5 wherein said disc has a diameter between 2 and 4 times the outer thread diameter of said screw.

7. Apparatus according to claim 1 including operating means carried by one of said stirrups and operable in response to relative pivotal movement of said stirrups to rotate said driver.

8. Apparatus according to claim 7 wherein said operating means comprises a ratchet mechanism.

9. Apparatus according to claim 8 wherein said ratchet mechanism comprises projections on said device and an arm pivoted on said one of said stirrups, said arm having at least one tooth engageable with said projections.

10. Apparatus according to claim 9 including spring means acting on said arm and urging it in a direction to enable said tooth to engage said projections.

* * * * *